A. MITCHELL.
Making Brooms.
No. 19,039.
Patented Jan. 5, 1858.
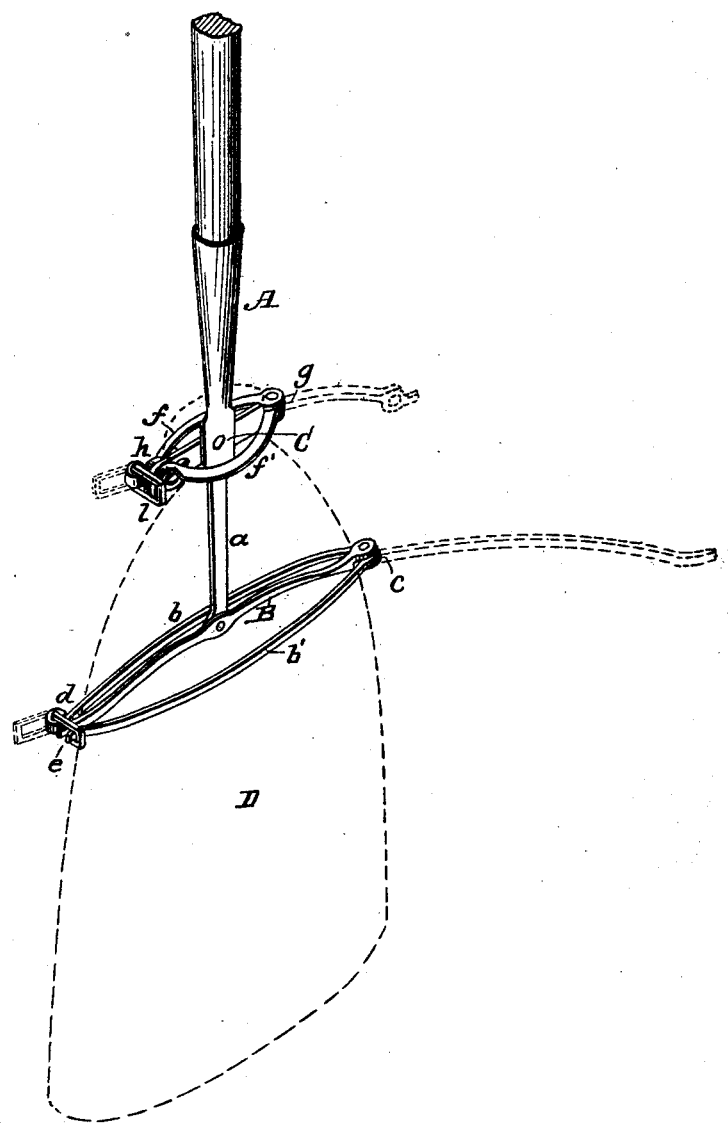

UNITED STATES PATENT OFFICE.

ABNER MITCHELL, OF EATON, PENNSYLVANIA.

CONSTRUCTION OF BROOMS.

Specification of Letters Patent No. 19,039, dated January 5, 1858.

*To all whom it may concern:*

Be it known that I, ABNER MITCHELL, of Eaton, in the county of Wyoming and State of Pennsylvania, have invented a new and useful Improvement in the Construction of Brooms; and I do hereby declare that the following is a full, clear, and exact description of the same, reference being had to the annexed drawing, making a part of this specification, said drawing being a perspective view of my improvement.

My invention consists in having a metal socket attached to two clamps, as will be presently shown and described, whereby the whisks of corn are firmly secured together, and also the socket which receives the handle firmly attached to or connected with the whisks of corn; so that a durable, cheap, and efficient broom is obtained, and one that can be readily manufactured.

To enable those skilled in the art to fully understand and construct my invention, I will proceed to describe it.

A, represents a metal socket, which is made sufficiently large in diameter to receive the end of the broom-handle. The lower end of the socket has a shank $a$, attached to it. To the lower end of the shank $a$, a cross-bar, B, is attached; and to one end of the bar B, two rods, $b$, $b^1$, are connected by joints, $c$. To the opposite end of the bar $b$, a loop, $d$, is attached; and a hook, $e$, is formed at the end of the other bar, $b^1$.

To the upper end of the shank $a$, at its junction with the socket A, a cross-bar, C, is attached. This bar is considerably shorter than the bar B, and has two curved bars or rods, $f$, $f^1$, connected to one of its ends by joints, $g$. To the opposite end of the bar $f$, a loop, $h$, is attached; and a hook, $i$, is formed at the end of the bar or rod, $f^1$.

The whisks of corn, D, forming the broom, are placed between the two sets of bars or rods, $b$, $b^1$, and $f$, $f^1$; the cross-bars B, C, passing through the centers of the whisks; and when the requisite quantity are placed between the bars or rods, they are pressed together and secured by passing the loops, $d$, $h$, over the ends of their respective bars or rods, $b^1$, $f^1$. The bars or rods $b$, $b^1$, $f$, $f^1$, form clamps which secure the whisks in proper position, and by their use the twine and wire binding now employed are dispensed with.

This invention is extremely simple, and possesses two important advantages over the usual mode of construction; 1st, the whisks are bound more securely together than by the usual twine and wire binding, and the handle may be firmly secured to the broom and cannot work loose as in those of usual make. 2nd, any person inexperienced in making brooms, or persons that are not adepts in such matters, or are not professed mechanics, may make a broom without difficulty. It is well known that farmers and the inhabitants of rural districts generally make their own brooms. In fact, many cultivate small pieces of broom corn for this especial purpose. The usual mode of construction requires considerable practice in order to make a well shaped and perfect broom, and perfectness is not obtained by inexperienced persons. By my improvement a broom may be made without difficulty, and the sockets and clamps may be made and sold by the quantity, so that they may be obtained by any person requiring them. The sockets and clamps will, of course, last a long time, not being subjected to any wear; and when the whisk is worn out the broom may be re-made, the same socket and handle being equally as good as at first.

I would remark that when the whisks of broom corn are fitted between the clamps, the ends of the bars or rods $b$, $b^1$, $f$, $f^1$, may be brought together by a screw or by any proper device; for in order to insure a perfect and durable broom, the whisks should be bound tightly together within the clamps, and the pressure of the hands or fingers would not be sufficient to bring the ends of the bars or rods together when a requisite quantity of whisks are placed between the clamps.

Having thus described my invention, what I claim as new, and desire to secure by Letters Patent, is:

The metal socket, A, with shank, $a$, and cross-bars, B, C, attached; the cross-bars having rods or bars, $b$, $b^1$, $f$, $f^1$, attached or connected at one end by joints, so that the whisks of broom corn may be secured or clamped between them; for the purpose set forth.

ABNER MITCHELL.

Witnesses:
A. K. PECKHAM,
IRA AVERY.